United States Patent
van Splunter et al.

(10) Patent No.: US 10,291,406 B2
(45) Date of Patent: May 14, 2019

(54) LOSSY ARITHMETIC

(71) Applicant: NXP B.V., Eindhoven (NL)

(72) Inventors: Marinus van Splunter, Helmond (NL); Artur Tadeusz Burchard, Eindhoven (NL)

(73) Assignee: NXP B.V., Eindhoven (NL)

( * ) Notice: Subject to any disclaimer, the term of this patent is extended or adjusted under 35 U.S.C. 154(b) by 227 days.

(21) Appl. No.: 15/616,260

(22) Filed: Jun. 7, 2017

(65) Prior Publication Data

US 2018/0006817 A1 Jan. 4, 2018

(30) Foreign Application Priority Data

Jun. 30, 2016 (EP) .................... 16177085

(51) Int. Cl.

| | |
|---|---|
| H04L 9/00 | (2006.01) |
| H04L 9/30 | (2006.01) |
| G06F 7/501 | (2006.01) |
| H04L 9/06 | (2006.01) |
| H04L 9/32 | (2006.01) |
| G06F 7/509 | (2006.01) |

(52) U.S. Cl.
CPC ............... *H04L 9/30* (2013.01); *G06F 7/501* (2013.01); *G06F 7/5095* (2013.01); *H04L 9/06* (2013.01); *H04L 9/3066* (2013.01); *H04L 9/32* (2013.01); *H04L 9/3247* (2013.01)

(58) Field of Classification Search
CPC ....................................................... H04L 9/30
USPC ........................................................ 380/282
See application file for complete search history.

(56) References Cited

U.S. PATENT DOCUMENTS

2014/0229716 A1\* 8/2014 Gueron .................. G06F 7/723
712/222

OTHER PUBLICATIONS

IEEE Vehicular Technology Society "IEEE Standard for Wireless Access in Vehicular Environments—Security Services for Applications and Management Messages", IEEE STD 1609.2™-2016 (Revision of IEEE Std 1609.2-2013),1-240 pgs. (2016).

IEEE Computer Society "Part 11: Wireless LAN Medium Access Control (MAC) and Physical Layer (PHY) Specifications", IEEE Std 802.11™-2012 (Revision of IEEE Std 802.11-2007), 1-2793 pgs. (2012).

(Continued)

*Primary Examiner* — Longbit Chai
(74) *Attorney, Agent, or Firm* — Rajeev Madnawat

(57) ABSTRACT

Embodiments include a method of adding first and second binary numbers having C bits and divided into D words to provide a third binary number in E successive adding operations, C, D and E being plural positive integers, the method comprising: a first group of D adding operations adding together respective words of the first and second binary numbers to provide D sum and carry outputs ranging from a least significant to a most significant sum and carry output; one or more subsequent groups of adding operations adding together sum and carry outputs from an immediately preceding group of adding operations, a final group of the one or more subsequent groups resulting in the third binary number consisting of the sum outputs from the final group and a carry from the most significant carry output of the final group, wherein E is less than D.

13 Claims, 9 Drawing Sheets

(56) References Cited

OTHER PUBLICATIONS

Detour, D. et al. "Software Carry-Save for Fast Multiple-Precision Algorithms", 12 pgs., Retrieved from the Internet Aug. 4, 2016 at::http ://lara. i nist. fr/bitstream/handle/2332/787 /LI P-RR2002-08.pdf?sequence=1 (Feb. 2002).

Camus, V. et al. "A low-power carry cut-back approximate adder with fixed-point implementation and floating-point precision", Proceedings of the 53rd Annual Design Automation Conference on, DAC '16, ACM Press, New York, New York, USA, 1-6 pgs. (Jun. 5, 2016).

Liu, G. et al. "CASA: Correlation-Aware Speculative Adders", Low Power Electronics and Design, 189-194 pgs. (Jan. 1, 2014).

\* cited by examiner

LOSSY ARITHMETIC

CROSS-REFERENCE TO RELATED APPLICATIONS

This application claims the priority under 35 U.S.C. § 119 of European Patent application no. 16177085.4, filed on Jun. 30, 2016, the contents of which are incorporated by reference herein.

FIELD

The disclosure relates to addition of binary numbers, with particular applications in multiplication of large numbers for cryptographic verification operations.

BACKGROUND

Intelligent Transport Systems (ITS), as defined by Directive 2010/40/EU, are systems in which information and communication technologies are applied in the field of road transport, including infrastructure, vehicles and users, and in traffic management and mobility management, as well as for interfaces with other modes of transport (Article 4(1) of the ITS Directive). In this context, reliable vehicle-to-vehicle (V2V) and vehicle-to-infrastructure (V2I) communication is an essential element. Such communication is used for both real time exchange of safety messages between vehicles and with infrastructure to resolve potentially dangerous road situations as well as to exchange essential information to improve traffic. V2V/V2I communication is based on the IEEE 802.11p standard, which is an amendment to the IEEE 802.11 standards to add wireless access in vehicular environments within the designated ITS band of 5.85 to 5.925 GHz.

Security of any communication links within ITS is clearly fundamental to prevent unwanted, wrong or misleading information. Security is predominantly used to authenticate that messages are coming from trusted sources, and therefore the information they carry can be trusted as well. This can be done using asymmetrical keys where a sender signs a message using their secret private key and a recipient can verify that the signature and message are coming from that particular sender using the sender's known public key corresponding to the private key.

The most widely known and used type of public key cryptography is RSA, based on the asymmetric difficulty of multiplying two large prime numbers and factorising the resulting number without prior knowledge of its factors. The two large prime numbers forms the basis of a private key, as this provides the solution to the factorisation problem, while the product can form the basis of a public key, whose knowledge cannot be used to easily determine the two prime factors. Another type of public key cryptography is known as Elliptic Curve Cryptography (ECC), which has been proposed for use in ITS, the main reason being that ECC keys and signatures are of much shorter length while still providing the same level of security as much longer keys in alternative approaches such as RSA. This property minimizes overhead in communication taking into account that the signature and the public key needs to be communicated with each message. Both types of cryptography require large numbers to be multiplied together as part of the verification process.

An ECC scheme is determined by key length and the chosen underlying curve. Typical ITS key lengths considered are, for example, 256 bits, 384 bits or 512 bits. The NIST (P256, P384, P512) curves are also used in ITS predominantly, but other choices such as Brainpool curves may be used. In ECC, the main algorithm for signing messages and verifying the signatures is called the Elliptic Curve Digital Signature Algorithm (ECDSA).

In ITS V2V or V2I (which may be encompassed by the general term V2X, or vehicle to everything), cars are typically broadcasting safety messages at rates of tens of messages per second (e.g. 10-20 Hz). A particular car may be receiving messages from hundreds (e.g. 100-200) of other cars and therefore needs to receive and authenticate thousands of messages a second (e.g. 1000-2000). Therefore, the speed of authentication computations is an important parameter in ITS, as this will determine how many messages can be authenticated and used for safety or traffic management applications and how many other cars a particular car can trust and consider in road situations.

Authentication computations, for example using ECDSA, are based on computation of large numbers (e.g. 256-512 bits and beyond). Basic computations involve multiplications, additions and subtractions of large numbers. Most other operations (including division) are based on these three operations. Considering that both multiplication and subtraction (in general, of large numbers in particular) are based on addition, a fundamental point is that addition of large numbers is a major contributor to computation times in large number arithmetic operations.

SUMMARY

In accordance with a first aspect there is provided a method of adding first and second binary numbers having C bits and divided into D words to provide a third binary number in E successive adding operations, C, D and E being plural positive integers, the method comprising:

a first group of D adding operations adding together respective words of the first and second binary numbers to provide D sum and carry outputs ranging from a least significant to a most significant sum and carry output;

one or more subsequent groups of adding operations adding together sum and carry outputs from an immediately preceding group of adding operations, a final group of the one or more subsequent groups resulting in the third binary number consisting of the sum outputs from the final group and a carry from the most significant carry output of the final group, wherein E is less than D.

By making E less than D, one or more carry propagation steps can be omitted, allowing the method to be performed in fewer clock cycles. An addition operation, particularly for addition of large numbers, can thereby be made considerably faster by omitting one or more carry propagation operations, at the expense of a small risk of obtaining an incorrect result. This risk can be adjusted by selecting how many carry propagation operations are omitted, i.e. how much smaller E is than D. The more carry propagation operations are omitted, the higher the risk.

In some implementations, C is at least 32, i.e. the number of bits in each of the first and second binary numbers is at least 32.

In some implementations, E is at least 3, i.e. at least two carry propagation operations are carried out.

In some implementations, D is at least 8, i.e. the number of words the first and second binary numbers are divided into, and the number of adding operations that would normally be carried out to achieve a guaranteed accurate result, is at least 8.

In accordance with a second aspect, there is provided an adder circuit configured to perform the method of the first aspect. The adder circuit may be configured to carry out the adding operations through a hardware configuration, or may be at least partially configured through software.

The adder circuit may comprise E successively arranged adders configured to perform the first and subsequent groups of adding operations, a first one of the adders consisting of D sub-adders, each successive adders consisting of one fewer sub-adder than an immediately preceding adder.

The adder circuit may comprise a carry detection module configured to receive carry outputs from each adder and to perform an OR operation to provide a carry detection output indicating the presence of any carry bit. The carry detection module can therefore be used to determine whether the incomplete series of addition operations is incorrect if the presence of a carry is detected.

In accordance with a third aspect there is provided a circuit for verification of received signals the circuit comprising the adder circuit of the second aspect, the circuit being configured to receive a signal to be verified that is encoded with a private key and to verify the signal by applying a corresponding public key in a cryptographic operation involving the adder circuit. The cryptographic operation may involve elliptic curve cryptography, or in alternative implementations may involve another type of asymmetric cryptography such as RSA.

In accordance with a fourth aspect there is provided a method of verifying a received signal, the method comprising:
  receiving a signal to be verified, the received signal encoded with a private key; and
  applying a corresponding public key to the received signal in a cryptographic operation,
  wherein the cryptographic operation includes an adding operation according to the first aspect.

The method of verifying a received signal can be made considerably faster by using the adding operation according to the first aspect, because carry propagation steps are omitted. A typical verification operation will involve a large number of adding operations, resulting in considerable savings in processing time.

If the cryptographic operation results in the received signal not being verified, which may be the result of the adding operation producing a wrong result, the method may be repeated using the adding operation with E equal to D. Repeating the method can then confirm whether the verification itself failed or if one or more of the adding operations carried out as part of the verification process produced an error.

Although the examples described herein focus on ECDSA as a cryptographic operation, the methods described herein may be applicable for other algorithms in which large (i.e. long) number binary arithmetic is required. Applications of the method may therefore lie outside of cryptographic operations and outside of ITS.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
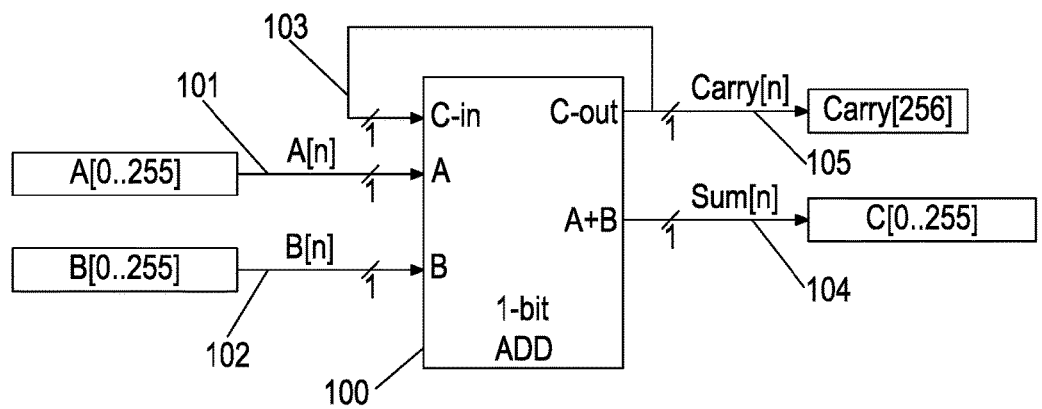
FIG. 1 is a schematic diagram of a standard one bit iterative (sequential) adder.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Hardware Addition Based on a 1-Bit Adder

Addition of any length numbers in its simplest form can be implemented as series of 1-bit additions, starting from the least significant bit (lsb) followed by carry propagation to the next bit addition. The simplest 1-bit adder 100, illustrated in FIG. 1, consists of three 1-bit inputs 101, 102, 103, two inputs 101, 102 coming from the two operands A[0 . . . 255], B[0 . . . 255] and one input 103 from the result of a carry propagation from a previous bit addition. This produces two 1-bit outputs 104, 105, one output 104 being the bit for the output sum C[0 . . . 255] and one for the carry bit 105. Addition of two 256 bit input numbers requires 256 steps, and produces a 257 bit output number. To stay within bit width of the input, the output is usually represented by 256 bits of the result with one carry bit, which in fact is the 257th bit of the output. It remains a function of a higher-level algorithm to decide what to do with carry bit, which in the case of fixed bit width arithmetic represents overflow of the arithmetic.

Hardware Addition Based on a k-Bit Adder

Figure 2:
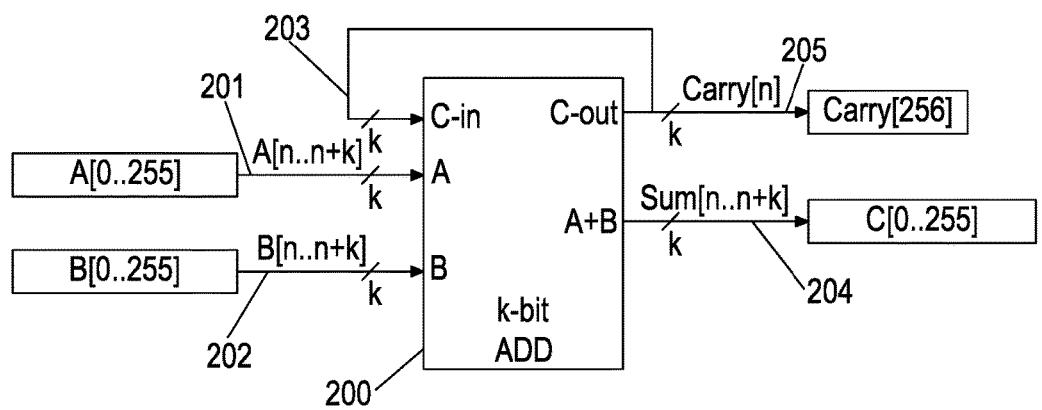
FIG. 2 is a schematic diagram of a standard N-bit iterative (sequential) adder.

In hardware, addition is usually implemented using a basic k-bit adder (where k may for example be 16, 32 or 64), which is able to realise a basic k-bit addition in one clock cycle. This is typical for hardware solutions. An example of a k-bit adder 200 is shown in FIG. 2. When computing large numbers a basic adder may be used to compute larger numbers, with the basic adder being used repeatedly over a number of clock cycles. If k is size of the basic adder, then a large N-bit number can be represented by N/k elements. The addition of a large N-bit number will therefore require N/k steps where k-bit elements (starting from the least significant) are consecutively added with the carry bit propagated to the next element addition. The N/k relation needs to be an integer number. The difference between the k-bit adder 200 in FIG. 2 compared with the 1-bit adder 100 in FIG. 1 is that each adding operation takes a k-bit word of the inputs A[0 . . . 255], B[0 . . . 255] and adds them in a single operation at inputs 201, 202 to produce a k-bit sum output 204 and a carry bit output 205, which is fed to the carry input 203 of the next addition.

The inputs 201, 202 in FIG. 2 are represented by portions A[n . . . n+k], B[n . . . n+k] of the input N-bit numbers A[0 . . . 255], B[0 . . . 255], where n is the starting bit in a step of carrying out a k-bit sized portion of the input N-bit numbers. The output 204, represented by Sum[n . . . n+k] is then the corresponding k-bit sized portion of the sum output C[0 . . . 255].

Internally a k-bit adder can be realized in many different ways, the possibilities including a 1-bit adder that runs at k-times the speed on one side to k 1-bit adders running in parallel with a carry bit traversing between them on the other side. There are many designs for k-bit adders from slowest but simplest ripple-carry adders to more complex but faster look-ahead carry adders that benefit from a fact that for a given number not every carry may need to be propagated, thereby reducing the average computation time. However, for any k-bit adder design, the carry propagation remains the critical path of the k-bit adder and determines the speed of computation.

Hardware Addition of Large Numbers

In a similar way to a k-bit adder being composed of 1-bit adders, large number adders can be composed of multiple k-bit adders. There are many implementations possible. Two possible implementations are shown in FIGS. 3 and 4, with FIG. 3 showing a sequential adder and FIG. 4 a parallel hierarchical adder.

Figure 3:
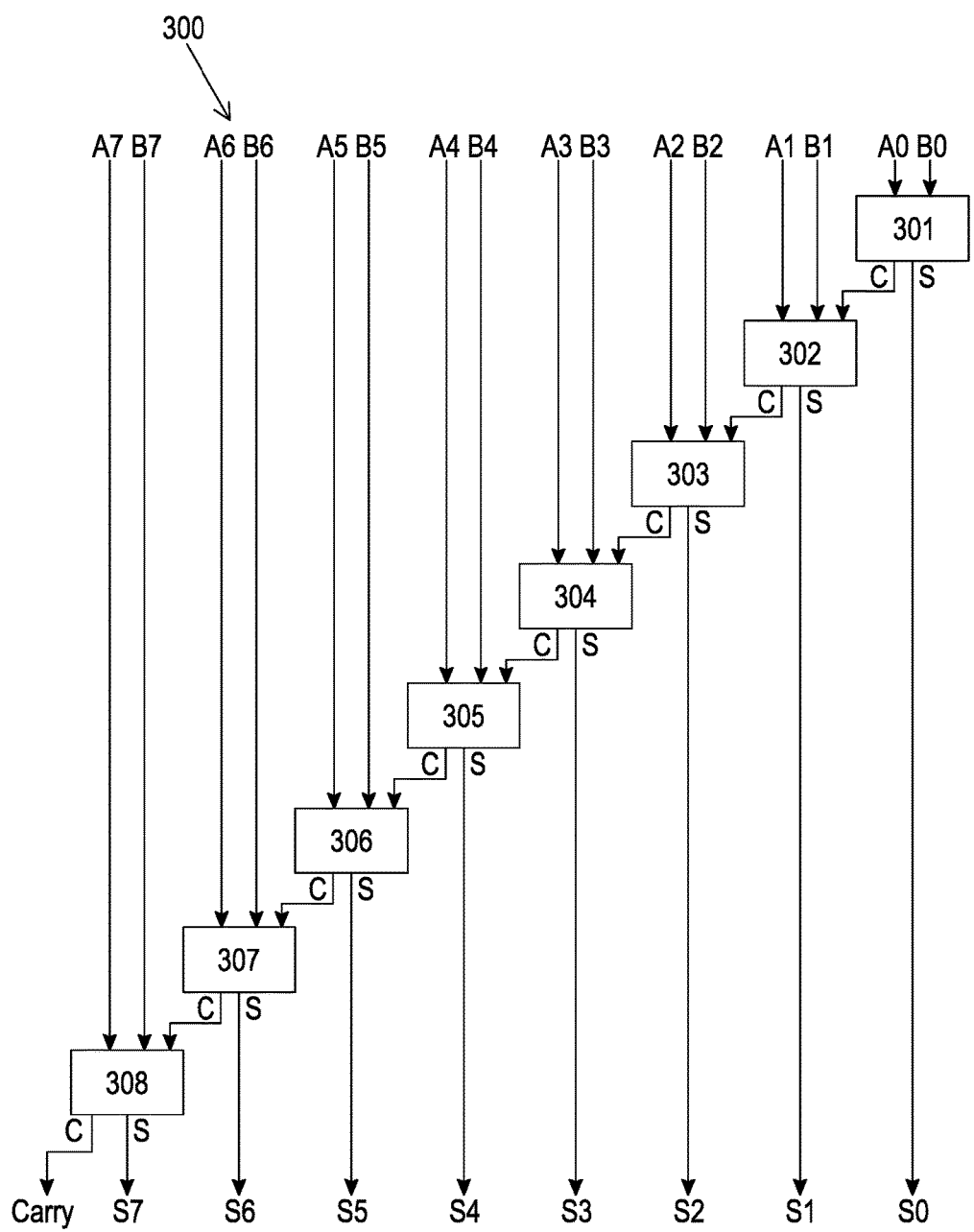
FIG. 3 is a schematic diagram of a hardware sequential 256 bit adder.

A sequential adder 300, as shown in FIG. 3, operates by adding elements (which, in the example shown in FIG. 3, are 32 bits wide) one by one, and propagating a carry to the next adding operation. A first one of the adding operations 301 takes two 32 bit inputs A0, B0 and adds them, resulting in a sum S and a carry C. Each subsequent adding operation 302-308 takes a pair of 32 bit inputs A1-A7 and B1-B7 of increasing significance and adds them together with the carry from an immediately preceding adding operation. The carry bit C thereby propagates through all eight adding operations 301-308, resulting in the total sum being the outputs S0-S7 from each adding operation 301-308 together with a carry from the most significant adding operation.

Figure 4:
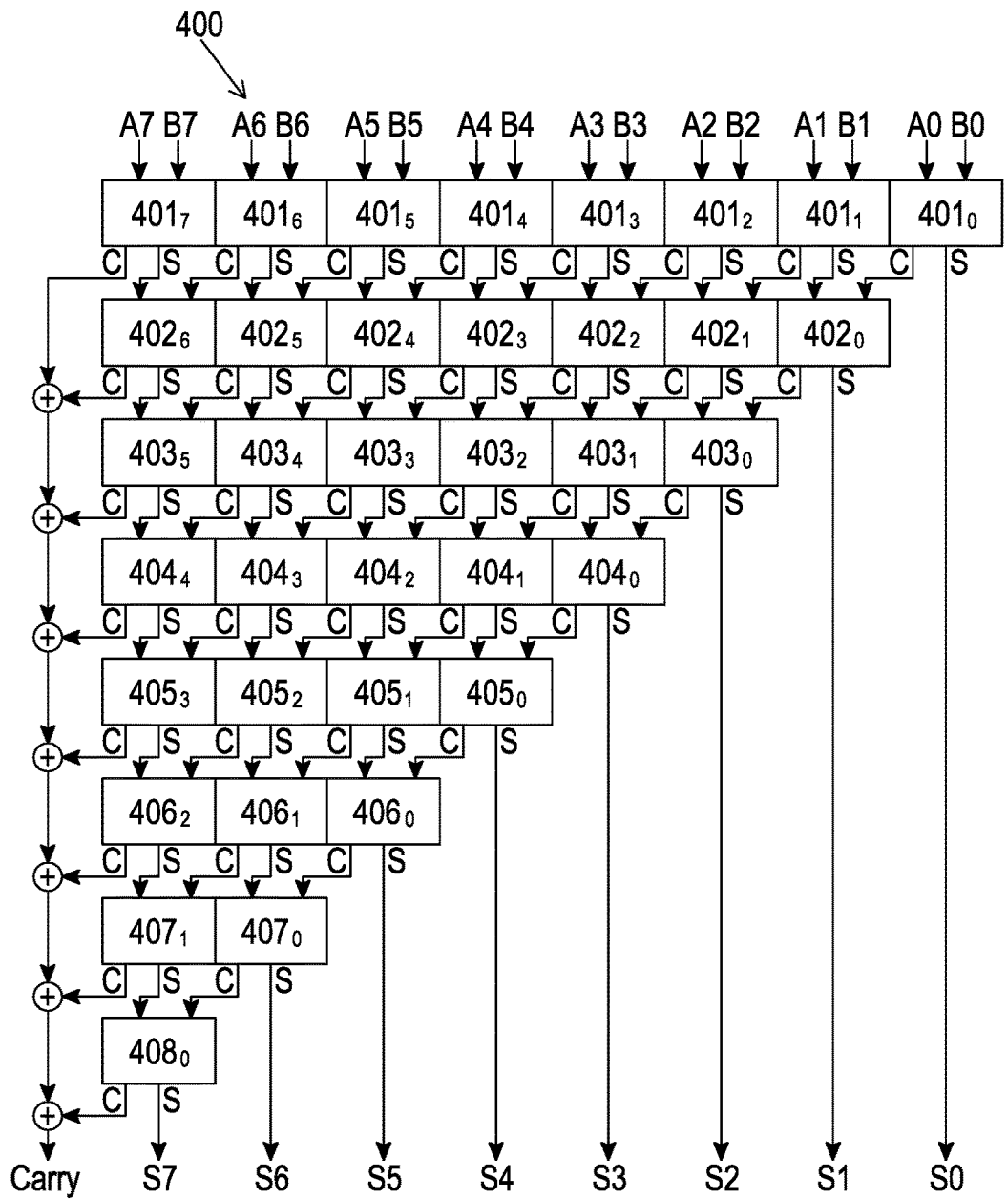
FIG. 4 is a schematic diagram of a hardware parallel hierarchical 256 bit adder.

A parallel hierarchical adder 400, an example of which is illustrated in FIG. 4, operates by adding all elements (which, in the example, are again 32 bits wide) at once, generating partial sums and carry bits. A first adding operation 401, comprising multiple sub-adding operations $401_0$-$401_7$, adds the components A0-A7 and B0-B7 in parallel, resulting in multiple sums S and carries C, which are provided to a subsequent adding operation 402 with one fewer sub-adding operation. The process then continues with adding operations 403 to 408, with the final adding operation 408 providing the most significant portion S7 of the sum, together with a final carry output. The sum S0-S7 is then made of the collocation of least significant sum outputs from each adding operation, and the carry output is an addition or XOR combination (since the resulting carry can only be either 1 or 0) of all of the carry outputs from the most significant sub-adding operation of each stage.

Software Addition of Large Numbers

For scalar processors, software addition of large numbers is based on repeating k-bit hardware adding, using the adder present in a processor's arithmetic unit (ALU), which typically is based on 8, 16, 32 or 64 bit computations. Therefore, software based large number additions in practice implement the sequential adder of the type shown in FIG. 3. When using an ALU for adding, it is best practice to identify the carry bit explicitly, for example in the form of a processor flag register, so that it can be detected and added in the next set of more significant bits. For example, prior to executing the next element addition the carry needs first to be added to one of the operands and checked for carry again. It is possible to access the carry flag register in assembly. If the carry is not exposed or the program is written in C (which has no access to CPU registers), then software needs to use a maximum k−1 bits for element addition such that carry can be stored in the most significant bit (msb) of the result and the addition cannot overflow. For practical reasons, typically in case the carry up flag is not accessible, the basic adder is used at half of its size (e.g. 16 bit in software for a 32 bit ALU) to keep the operant size convenient for the processor data path (e.g. 8, 16, 32 bit operands are naturally supported by 32 bit processor, while 24 bits is not). The carry bit produced in such case is located at the k/2+1 bit position (e.g. 17-bit for 16-bit based addition) and needs to be extracted by masking and shifting to be used as a carry bit for the next level addition. Taking care of the carry in software is therefore troublesome and increases the computation time of large numbers.

Multiplication of Large Numbers

Similar to additions for large number multiplications, large numbers are also divided into elements where shorter basic operations are executed (e.g. half of the ALU width). An example is a standard schoolbook long multiplication where first smaller-size element multiplication is performed followed by smaller-size additions. This is shown below.

|  |  |
|---|---|
| 27 |  |
| × 56 |  |

| Element Multiplication | |
|---|---|
| \|42\| | -> element multiplication 6 * 7 = 42 = 2, 4 is carried up to the next element |
| \|12\| | -> element multiplication 6 * 2 = 12 = 2, 1 is carried up to the next element |
| \|35\| | -> element multiplication 5 * 7 = 35 = 5, 2 is carried up to the next element |
| 10\|\| | -> element multiplication 5 * 2 = 10 = 0, 1 is carried up to the next element |

| Column Addition | |
|---|---|
| \|\|2 | -> column 1 addition 2 + 0 + 0 + 0 = 2, no carry up |
| \|\|1 | -> column 2 addition 4 + 2 + 5 + 0 = 11 = 1, 1 is carried up to the next element |

| | |
|---|---|
| \|5\|\| | -> column 3 addition 0 + 1 + 3 + 0 + 1(carry up) = 5, no carry up |
| 1\|\|\| | -> column 4 addition 0 + 0 + 0 + 1 = 1, no carry up |
| 1512 | |

It should be observed that column addition is in fact addition of smaller elements as described in the above k-bit adder description with exactly the same mechanism of propagating carry-ups between additions.

To speed up software implementations, it is preferred to use vector processors. Vector processors have multiple ALUs (e.g. 2, 4, or even 8), each containing basic operations like multiplication or addition. Vector processors are usually used for signal processing and are generally known as Vector DSPs. Vector DSPs can perform many basic element additions in parallel, speeding up execution considerably.

Figure 5:
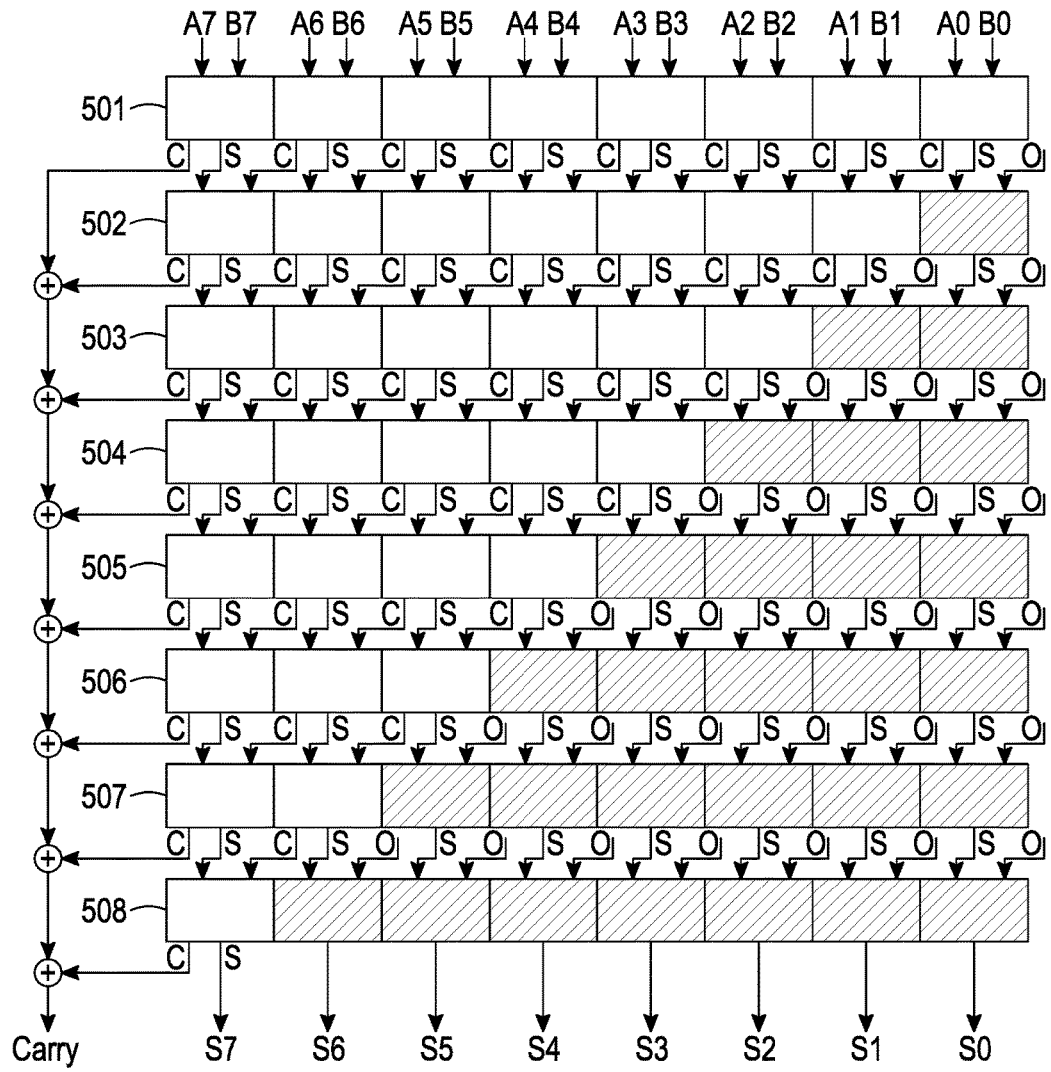
FIG. 5 is a schematic diagram of 256 bit addition on a 32 bit 8-way vector processor.

In principle, software running on Vector DSPs implements the type of partial hierarchical adder from FIG. 4, as presented on FIG. 5, in which some elements (shown as shaded boxes) are not strictly required and are just adding zeros but are still present due to the vector nature of the operation.

Oversized DSP Registers

DSPs usually have oversized internal registers (e.g. 20 instead of 16, or 40 instead of 32) such that many operations (e.g. additions) can be done before the register will overflow. This avoids the need for handling of operation (register) overflows at every step. Vector DSPs usually will also have vector registers oversized such that each element in a vector is oversized as discussed above. Such oversizing of registers is useful since a carry-up bit for each element addition will be stored in the result itself at the msb position of the extra bits (e.g. at bit 33 for a 32 bit addition using 40 bit oversized registers with 8 extra bits). This avoids the need to run the basic addition at half of the computational resolution to save the carry in the result or avoids the need to have a special flag (vectorized per element) as explained above.

Details of Vectorized Addition

Considering the above type of Vector DSP with a vector size of 8×32 bit elements and oversized registers to 40 bits, addition of two 256-bit numbers A and B can be realized as follows:

Example 1

1. Load 256-bit operand A into vector register vA: split A into 8 numbers 32 bit each and load 8 32 bit A-elements into 32 least significant bits to each of 8 A-vector register elements.

2. Load 256-bit operand B into vector register vB: split A into 8 numbers 32 bit each and load 8 32 bit B-elements into 32 least significant bits to each of 8 B-vector register elements.

3. Add all elements in parallel into an output register vS in 1 clock cycle.

4. Propagate carry between 8 elements in 7 steps.

For each step, the carry propagation can be done best for a vector operation as follows:

For each element, the carry may be stored in bit 32 (being the lsb of the extra bits in an oversized register).

4a. Extract all the 8 carry bits from all elements by vector masking to 8 elements of a carry vector vC.

4b. Store most significant element of vC into variable and => if it is not zero it indicates that overflow of 256 bit addition happened.

4c. Shift vC vector by 1 element left.

4d. Shift all elements in vC right by 32 bit positions so that all carry bits are at lsb position aligned with the proper (next) element of the result vS register.

4e. Clear all the 8 carry bits from all elements of vS vector by logical AND with a mask register.

4f. Perform Vector add of vS and vC.

4i. The least significant element will not be changed since carry element is equal to zero, but all other caries may be present so need to be propagated to more significant element.

4a-4g are to be executed 7 times (corresponding to 7 carry propagation steps).

5. Store the result.

Figure 6:
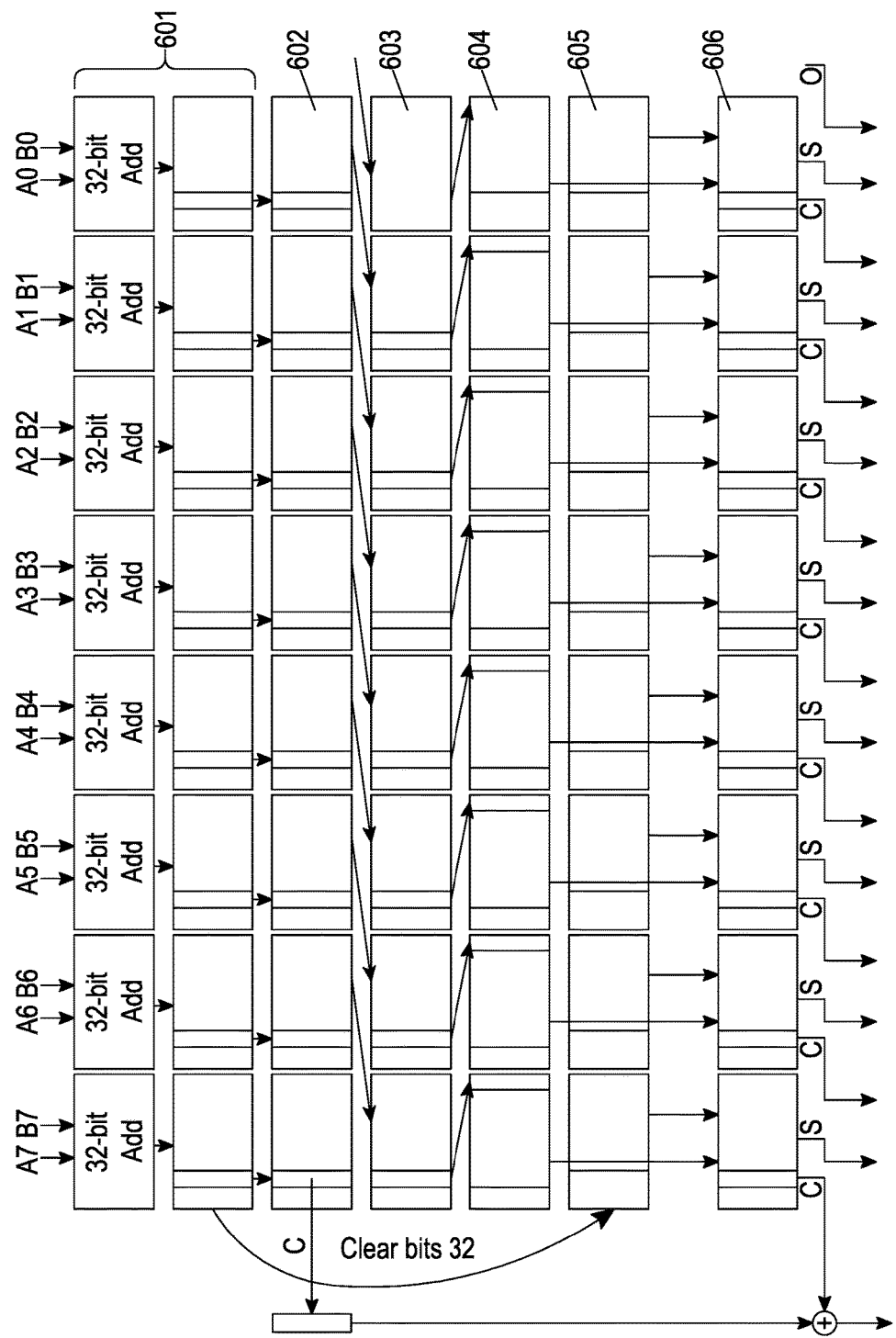
FIG. 6 is a schematic diagram illustrating details of a carry propagation step on a vector processor.

Steps 1-5, i.e. the basic steps of addition, carry propagation and storage, are illustrated in FIG. 5, while sub-steps 4a-4f are presented in FIG. 6. In FIG. 5, the vector registers vA and vB are represented by the series of blocks 501 and each subsequent propagation stage is represented by the series of blocks 502 to 508. In FIG. 6, the vector addition of A and B to produce a sum vector vS is represented by blocks 601. The subsequent block 602 involves the carry bit extraction into the carry vector vC, which is stored. The next block 603 is the shift operation, in which all elements are shifted by one element of the block 603. The next block 604 is the further shift operation where all elements are shifted by 32 bits. The next block 605 involves the carry vector vC being cleared, and the final block 606 involves the vector addition of vC to vS to produce the sum vector vS.

Taking 1 clock cycle for each of steps 1, 2, 3 and 5 above, and also 1 clock cycle for each of steps 4a-4f, the total number of cycles for such an adder works out at 3+7×6+1=46.

The above example shows that vectored addition is still taking 8 steps, similar to scalar addition of 32 bit elements propagating a carry between them. Vectorization speeds up element addition by N-times, where N is number of vector element, but carry propagation is sequential in nature and therefore no advantage from vector operation is gained for large vector additions. Carry propagation also remains a problem for vectored operations.

Multiple Vector Addictions (With Carry-Up Accumulation)

When many large numbers are added together, oversized registers will enable reuse of carry propagation steps for all additions. First, we vector add 2 large numbers together, creating partial sums and carry bits on bit 32. A new large number then can be added to the result in exactly the same manner. Vector addition can be repeated many times adding all operands together, creating partial sums and carry bits accumulating in the extra bits of oversized registers (e.g. on positions 39-33). After all numbers are added the carry-up bits from repeated calculations will be accumulated on the extra bits, since also the extra bits are being added in the same way as basic bits. In the example of x additional bits 2x additions can be performed before carry-up bits can overflow the extra bits. Using 20 bit registers for 16 bit basic elements, additions can perform 24=16 additions to be executed with a guarantee of no overflow.

Software ECC

Depending on the chosen architecture, ECC can be executed in a dedicated hardware block in or in software on a CPU. A hardware implementation usually has larger bit-width of basic adder (e.g. 128, 256), while a software implementation uses the basic hardware adder of a processor of smaller size (e.g. 16, 32, 64). Extracting the carry in software is also troublesome as explained earlier.

The Problem to be Solved

For any architecture for large number computation, when performing addition the carry needs to be propagated, which takes a considerable amount of the time. As a result, carry propagation takes a considerable amount of the time needed to perform an algorithm like ECDSA.

The number of carry propagation steps is one less than the number of vector elements in the large number being added. For example, for a 256 bit number with 32 bit elements we will require 256/32−1=7 carry propagation steps.

If we consider all actions (1-3&5) as presented in the above example 1 and each of the software (vector) instructions (4a-4f) on FIG. 6 to take 1 clock cycle, in this implementation example the total number of clock cycles is 46, out of which 42 (91.3%) are needed for carry propagation, 3 to load/store (6.5%) and 1 for the actual (vector) addition (2.2%).

For a hardware implementation of such a hierarchical adder, a similar trade-off between element adding and carry propagation is present. Carry propagation is expensive in software vector implementations and in hardware when a Hierarchical Parallel Adder is used.

Generalization to Hardware

This problem is the biggest for software implementation on vector processors (DSP, SIMD) where there are a number of basic adders and where the bit-width of the basic element is small compared to the bit-width of the large number, meaning that there are many elements or even vectors needed for computation of the large number. In that case the carry-up needs to be propagated almost as many times as there are elements in a big number. However, this problem can be generalized to any software or hardware implementation that enables a number of basic elements/adders to be executed in parallel and where the addition of elements takes little time and carry-up propagation becomes the bottleneck, or limiting factor.

In the following, an example implementation is detailed based on a vector processor software implementation. Other implementations, however, are also possible, as mentioned above.

Example Implementation

Figure 7:
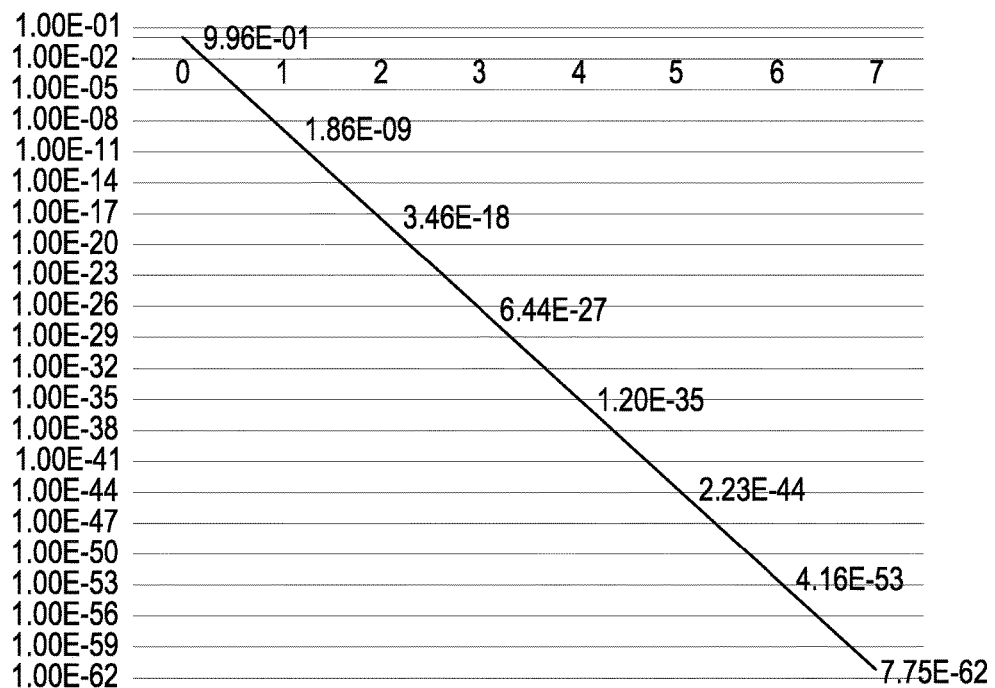
FIG. 7 is a plot of carry probability as a function of number of carry propagation steps.

If we take the adders from FIG. 5 and FIG. 6 as the starting point, it can be observed that a carry propagation is needed only when there are carry bits present from a previous step. If all carry bits are zero, the computation can stop. Calculating the probability that at least one carry bit is present at each step results in the plot shown in FIG. 7. It is evident from this (the Y scale is logarithmic) that the probability of a propagated carry rapidly (exponentially) decreases for each of the iterations from the first to the seventh iteration.

After the first element addition (step 0) and before the first carry propagation step, the probability that any of the 7 carry bits (the last one does not need to be propagated) is present is >0.99 (>99%). After the first carry propagation step and before the second iteration, however, the probability that any remaining carry bits is present is already much lower, at $1.85 \times 10^{-9}$. This low probability comes from the fact that at each carry propagation step, one carry needs to propagate through a 32 bit number. This will happen only if all 32 bits are 1. If there is at least one zero in the 32 bits the carry will not propagate. In the initial element addition all carries between all bits were already propagated and resolved. The probability P of one carry bit propagating through all 32 bits is given by the following formula:

$$P=(0.5)^{32}=2.33 \times 10^{-10}$$

It is important to notice that this carry probability defines the chance of a computation error in case carry propagation computation stops at a given step and the rest of steps are skipped.

Figure 8:
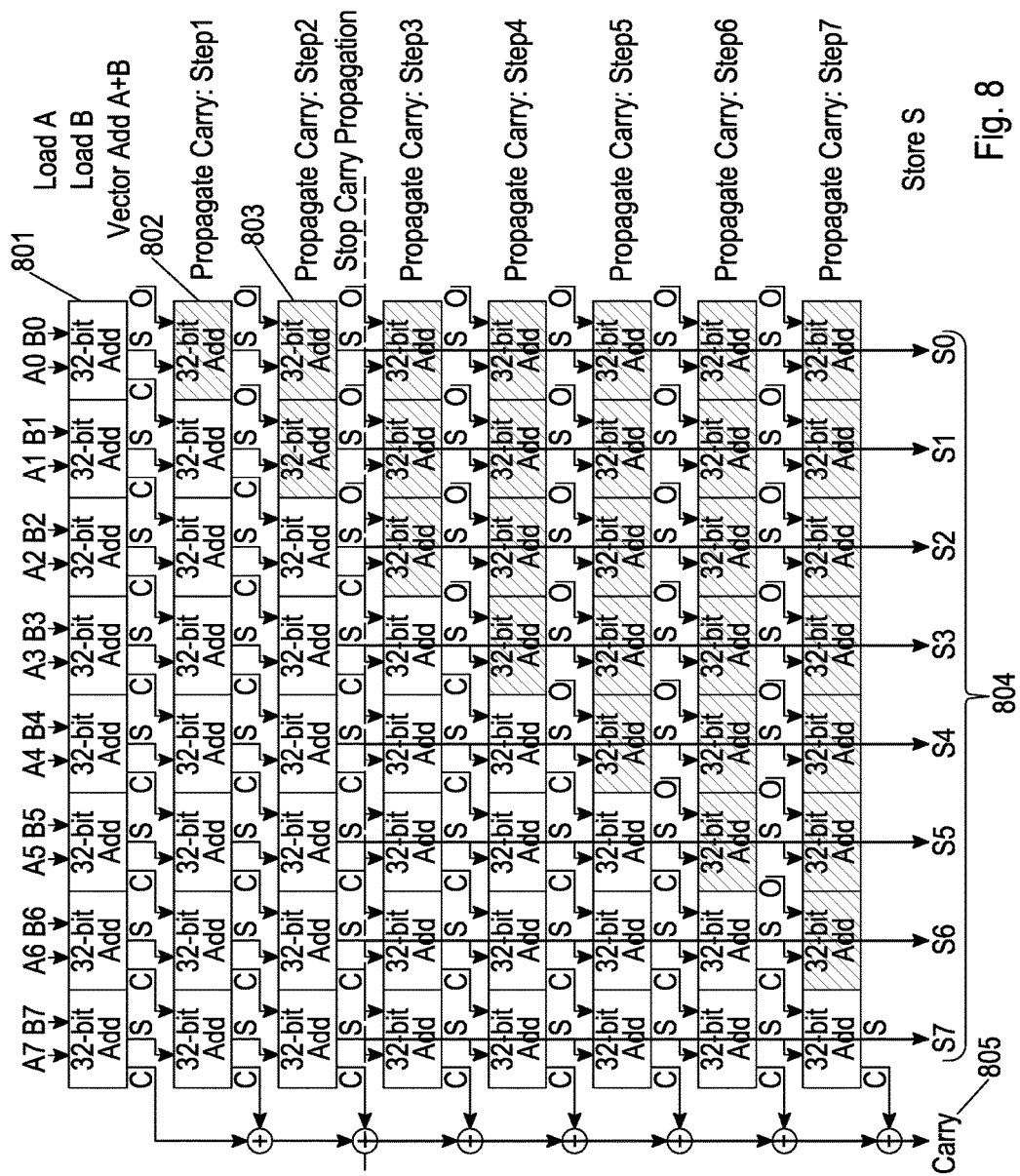
FIG. 8 is a schematic diagram of an example of an adder with carry propagation steps omitted.

Based on this principle, the sequence of operations laid out in FIG. 5 may be amended, such that one or more carry propagation steps are omitted. An example of this is illustrated in FIG. 8, where five carry propagation steps are omitted. The general principle is that the number of carry propagation steps can be limited in order to speed up the arithmetic. The probability of carry propagation being required for each iteration is low, and skipping more iterations will result in a higher probability of error, but this error probability can be made to be extremely low.

In FIG. 8, first and second binary numbers A and B are each divided into 8 words A0 to A7 and B0 to B7, which are input to the first step 801 of the addition process. The binary numbers A and B are added in this first step, in this case using vector addition comprising eight parallel adding operations adding together respective words A0 to A7, B0 to B7 of the numbers A and B, to provide eight sum and carry outputs ranging from a least significant to a most significant sum and carry output. A first subsequent carry propagation step 802 comprises a group of adding operations adding together sum and carry outputs from the first step 801. The sum and carry outputs and provided to a second subsequent carry propagation step 803 which does the same. Further carry propagation steps are omitted in this example, and carry propagation stops after only three steps of a possible eight are completed. The sum output is then provided by the sum outputs 804 of the second carry propagation step 803 together with the carry 805 from the most significant carry output of the second carry propagation step 803. The number of carry propagation steps can be altered depending on the required maximum error rate, with at least one carry propagation step being required and a maximum number of addition steps being one fewer than the number of words the input numbers are divided into.

In the example in FIG. 8, five carry propagation steps are omitted. This will result in the probability of there being an error in the output sum being $3.45 \times 10^{-18}$. Since we run only 2 carry propagation steps, the cycle count for such an adder is 3+2*6+1=16 which saves 30 clock cycles of the usual 46 clock cycles for a full adder, resulting in a performance improvement of 65% with only a very limited possibility of the output sum being incorrect.

Figure 9:
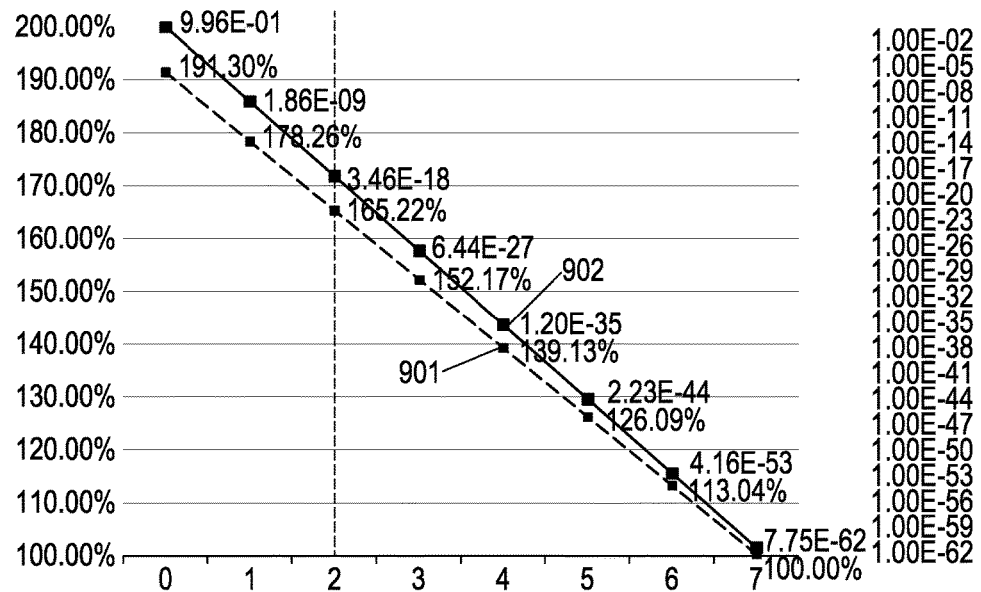
FIG. 9 is a plot of performance and error probability as a function of number of carry propagation steps.

FIG. 9 shows the relation for a single addition (for our example) between adder performance 901 (relative to the maximum) and adder error probability 902 for each step (step 0 being the initial element addition). Normal performance is set at 100% for seven carry propagation steps, and this increases to just over 190% for omission of all carry propagation steps. Missing all carry propagation steps, however, results in too high a chance of error, so in practical implementations at least one carry propagation step is carried out, resulting in a performance improvement of around 78% with a possibility of an error being $1.86 \times 10^{-9}$.

Error Handling at Adder Level

When we skip carry iterations, computation sometimes will go wrong. If this occurs, action could be taken to correct the error. In some applications, however, particularly if the possibility of an error is sufficiently low, no action could be taken. An error rate of $10^{-18}$, for example, is a typical error rate for memories or hardware logic. The actual error rate of an algorithm or application using a lossy adder, however, may be much higher because many additions may be done in one computation. In a verification process, for example, 5000 additions may be required for one verification, and there may be 2000 verifications per second. The actual possibility of there being an error in any given second therefore works out at $3.4 \times 10^{-11}$. For more computationally intensive algorithms this may be different.

Figure 10:
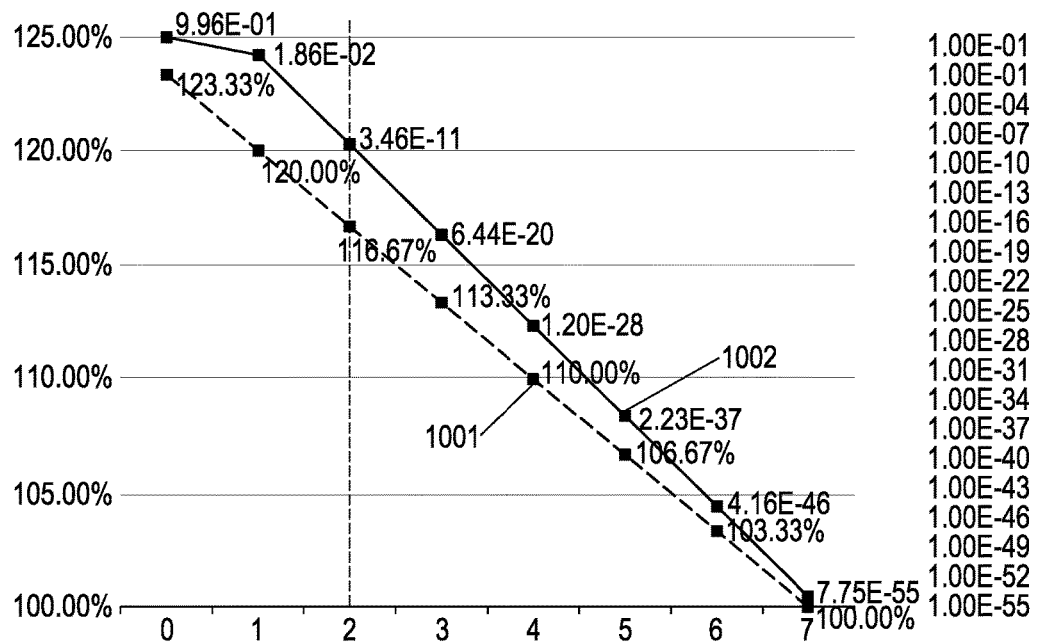
FIG. 10 is a plot of performance and error probability as a function of number of carry propagation steps for ECDSA verification.

FIG. 10 shows the relation for an ECDSA verification (for our example) between verification performance 1001 (relative to maximum 100% performance for 7 carry propagation steps) and error probability 1002 for each step (where step 0 is the initial element addition). It can be observed that for a single adder the acceptable error rate may have been reached already at step 1, while for an ECDSA verification the acceptable level may be at step 2 due to many additions being used. Such plot can be made for a given application where both performance and error rate can be adjusted according to the application. Performance therefore needs to be assessed in the context of the ratio of additions and other operations and the error rate needs to be adjusted with usage of the adder. A realistic trade-off can then be made for a given application.

Figure 11:
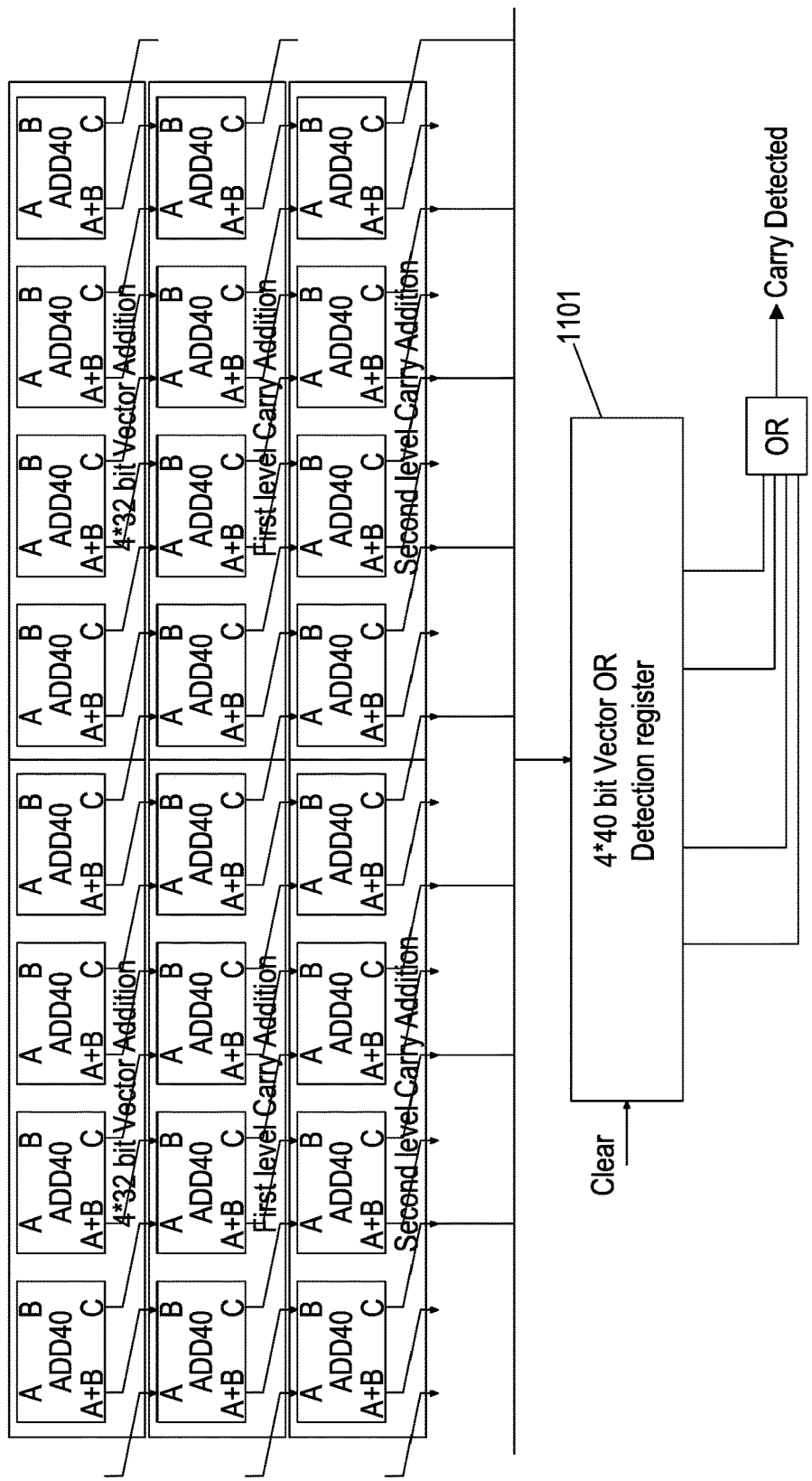
FIG. 11 is a schematic diagram of a carry detection module.

One option is to carry out detection for 100% cases where arithmetic has caused an error. While doing a limited number of iterations we still can do detections if a carry was missed. This can be realized by keeping one global vector register of size n (number of elements) that performs a logical OR on all carry bits at the moment we stop the carry propagation steps. After element additions in the last iteration we OR the result register with global register. After the whole verification we check the top 8 bits (39-32) for presence of a one in each element. If there was one the carry was missed. At application level we can decide to ignore error or to detect it. An example is illustrated in FIG. 11, where a carry detection module 1101 is connected to the carry outputs of the second level carry addition (where the adder 1102 has only two carry propagation stages). The carry detection module 1101 performs an OR operation on the carry outputs and if any carry is detected a detection signal is output from the register 1101.

Error Handling at ECDSA Level

At the application level, in the case of ECDSA verifications we can also mitigate the error in different ways. In a case where the error is detected, if a carry was missed the verification steps can be repeated using full adders to ensure that the calculation is error free. In a case where the error is ignored, when a failed verification occurs the verification can be repeated using full adders to check whether the failed verification was actually due to a miscalculation. Failed verifications normally do not happen so they will occur very rarely (based on error probability) from the lossy arithmetic and can be re-verified using full addition, contributing to an extra load at the same rate as the probability of the error, which therefore adds a very small additional load on the overall operation. Only in the event of an attempted attack could there be more failed verifications. In that case the process can be switched to verification based on full adders.

The concepts described herein are directly applicable also to subtractions, since vector subtraction of large numbers is decomposed into element subtractions followed by borrow bit propagation, which is implementable in exactly the same way as carry bit propagation.

The concepts described are applicable for any security system based on modular mathematic, and in the broadest sense for any system where computations (addition in particular) of large numbers are required and the end result would result in a false negative. The examples described herein, however, focus on application of the concept to ECC based security for ITS.

The concept may be generalised for any lossy arithmetic, but is especially applicable for large number arithmetic, where security is one of the examples of algorithms using large number arithmetic.

The concepts described herein can be applied to hierarchical adders such as Vector DSPs, and may be applicable to any large number adder that is based on smaller size basic adders. The larger the number to compute, the lower the chance of a computation error. How many carry propagation steps to skip is application dependent. It is evident that the error rate for a single large number adder is very low after the first carry propagation step that follows element addition, so for many applications this may be the optimum solution. For more computationally intensive algorithms more iterations may need to be done, as a result of the number of additions becoming high.

The use of lossy arithmetic is applicable to algorithms in which failed results occur at a low rate (or does not occur at all). If the failure rate is too high, it may take more time to repeat every failed calculation using full arithmetic.

From reading the present disclosure, other variations and modifications will be apparent to the skilled person. Such variations and modifications may involve equivalent and other features which are already known in the art of binary addition, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of verifying a received signal encoded with a private key, the method comprising:
applying a corresponding public key to the received signal encoded with the private key in a cryptographic operation including an adding operation performed in following steps:
adding with a vector processor first and second binary numbers having C bits with each being divided into D words to provide a third binary number corresponding to a number of successive adding operations E, whereon C, D and E being plural positive integers;

a first group of D adding operations that add together respective words of the first and second binary numbers to provide D sum and carry outputs that are ranged from a least significant to a most significant sum and carry output;

one or more subsequent groups of adding operations that further add together sum and carry outputs from an immediately preceding group of the adding operations, and a final group of the one or more subsequent groups that generates the third binary number consisting of the sum outputs from the final group and a carry from the most significant carry output of the final group, wherein the number of successive adding operations E is less than a number of D words such that carry propagation steps stop prior to completing a predetermined maximum number of D addition operations by omitting a configurable number of carry propagation steps in the adding operations to accommodate a considerably faster cryptographic verification process.

2. The method of claim 1, wherein C is at least 32.

3. The method of claim 1, wherein E is at least 3.

4. The method of claim 1, wherein D is at least 8.

5. An adder circuit configured to perform the method of claim 1.

6. The adder circuit of claim 5, comprising E successively arranged adders configured to perform the first and subsequent groups of adding operations, a first one of the adders consisting of D sub-adders, each successive adders consisting of one fewer sub-adder than an immediately preceding adder.

7. The adder circuit of claim 5, comprising a carry detection module configured to receive carry outputs from each adder and to perform an OR operation to provide a carry detection output indicating the presence of any carry bit.

8. A circuit for verification of received signals, the circuit comprising the adder circuit of claim 5, the circuit configured to receive a signal to be verified encoded with a private key and to verify the signal by applying a corresponding public key in a cryptographic operation involving the adder circuit.

9. The circuit of claim 8, wherein the cryptographic operation involves elliptic curve cryptography.

10. A method of verifying a received signal, the method comprising:

receiving a signal to be verified, the received signal encoded with a private key; and applying a corresponding public key to the received signal in a cryptographic operation, wherein the cryptographic operation includes an adding operation according to claim 1.

11. The method according to claim 10, wherein, if the cryptographic operation results in the received signal not being verified, the method is repeated using the adding operation with E equal to D.

12. The method of claim 10, wherein the cryptographic operation involves elliptic curve cryptography.

13. A computer program product embodied in a non-transitory computer readable storage medium comprising code executable to cause a computer to perform the method according to claim 1.

* * * * *